Figure 1:
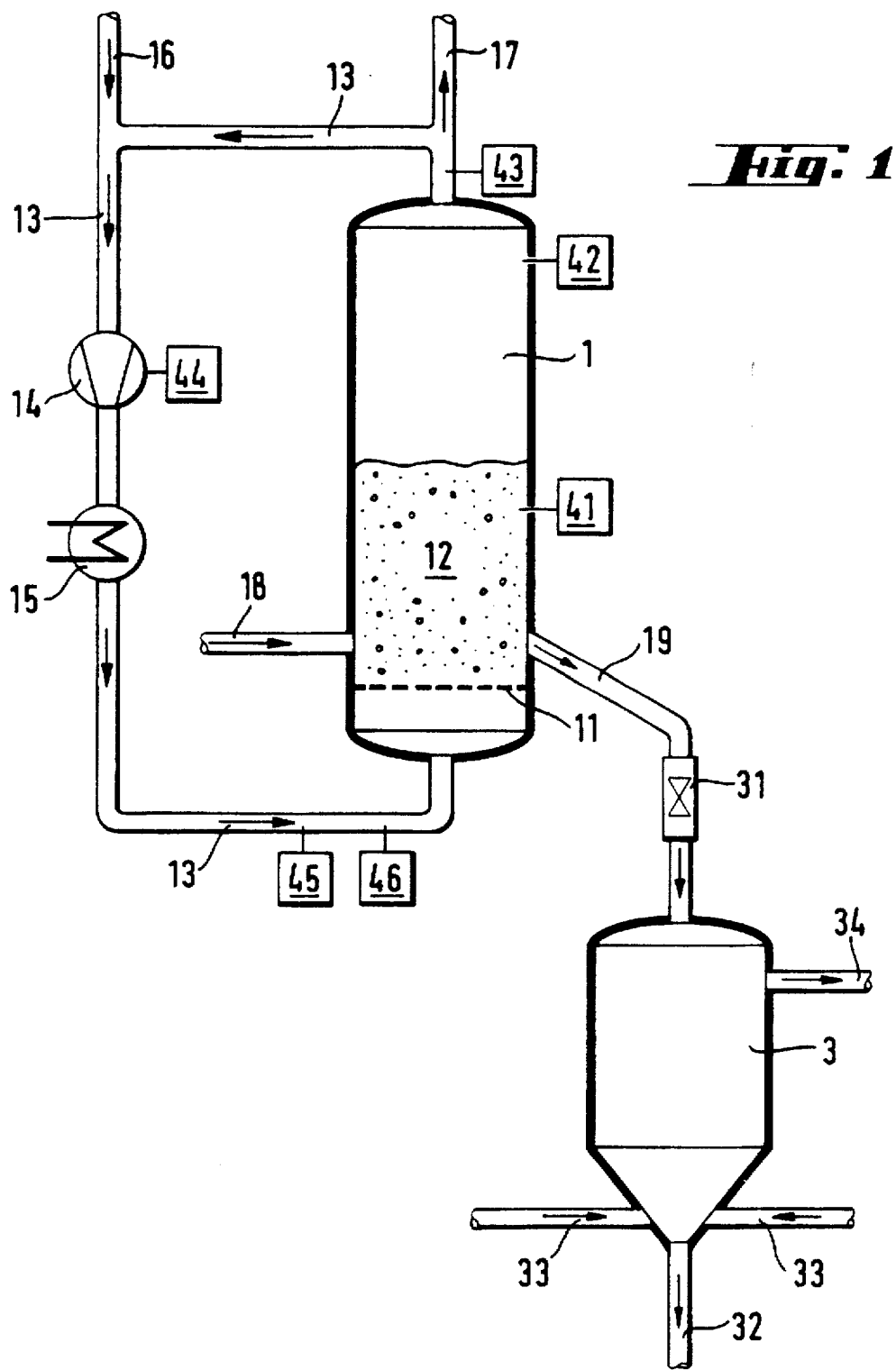

United States Patent [19]

Breuers et al.

[11] Patent Number: 5,798,309

[45] Date of Patent: Aug. 25, 1998

[54] PROCESS FOR PREPARING A POLY-1-OLEFIN

[75] Inventors: Werner Breuers, Eppstein; Rainer Lecht, Kelkheim; Ludwig Böhm, Hattersheim, all of Germany

[73] Assignee: Hostalen Polyethylen GmbH, Germany

[21] Appl. No.: 576,858

[22] Filed: Dec. 22, 1995

Related U.S. Application Data

[63] Continuation of Ser. No. 202,831, Feb. 28, 1994, abandoned.

[30] Foreign Application Priority Data

Mar. 2, 1993 [DE] Germany ............... 43 06 382.9

[51] Int. Cl.$^6$ ................ C08F 4/654; C08F 10/02
[52] U.S. Cl. ................ 502/111; 502/8; 502/115; 526/124.9; 526/142; 526/144; 526/352; 526/904; 526/65; 526/901
[58] Field of Search ...................... 502/104, 111

[56] References Cited

U.S. PATENT DOCUMENTS

| | | | |
|---|---|---|---|
| 3,642,746 | 2/1972 | Kashiwa et al. | 526/352 |
| 4,115,319 | 9/1978 | Scata et al. | 526/142 |
| 4,252,670 | 2/1981 | Caunt et al. | 526/142 |
| 4,330,647 | 5/1982 | Sakurai et al. | 526/144 |
| 4,363,902 | 12/1982 | Kurz . | |
| 4,439,539 | 3/1984 | Takitani et al. . | |
| 4,442,225 | 4/1984 | Takitani et al. . | |
| 4,487,846 | 12/1984 | Bailly et al. . | |
| 4,511,703 | 4/1985 | Bailly et al. | 526/125 |
| 5,270,275 | 12/1993 | Luciani et al. | 526/124.2 |

FOREIGN PATENT DOCUMENTS

| | | |
|---|---|---|
| 640 488 | 1/1992 | Australia . |
| 1297233 | 3/1992 | Canada . |
| 0 180 338 | 5/1986 | European Pat. Off. . |
| 0 249 869 | 12/1987 | European Pat. Off. . |
| 0 257 131 | 3/1988 | European Pat. Off. . |
| 0 563 815 | 10/1993 | European Pat. Off. . |
| 30 10 202 | 9/1981 | Germany . |
| 0 099 284 | 1/1984 | Germany . |
| 2 047 255 | 11/1980 | United Kingdom . |
| 92/00332 | 1/1992 | WIPO . |

*Primary Examiner*—Edward J. Smith
*Attorney, Agent, or Firm*—Connolly & Hutz

[57] ABSTRACT

Process for preparing a poly-1-olefin

By means of a highly active spherical Ziegler catalyst based on a dialkylmagnesium, spherical polymers can be obtained in the polymerization of alpha-olefins. A further advantage of the catalyst of the invention lies in the high catalyst activity, so that only very small amounts of the catalyst are required for the polymerization. The residual titanium and/or zirconium content in the polymers prepared according to the invention is less than 10 ppm. Owing to its good responsiveness to hydrogen, the catalyst is particularly suited to two-stage processes for preparing polymers having a broad bimodal molecular weight distribution. The replacement of sulfur-containing electron donors such as diethyl sulfite by alcohols such as ethanol leads to less odor problems and broadened opportunities for use of the polymer.

Owing to the spherical shape of the particles and the associated very good flow behavior of the polymers and copolymers, considerable simplification and advantages in handling, drying and processing are achieved.

1 Claim, 2 Drawing Sheets

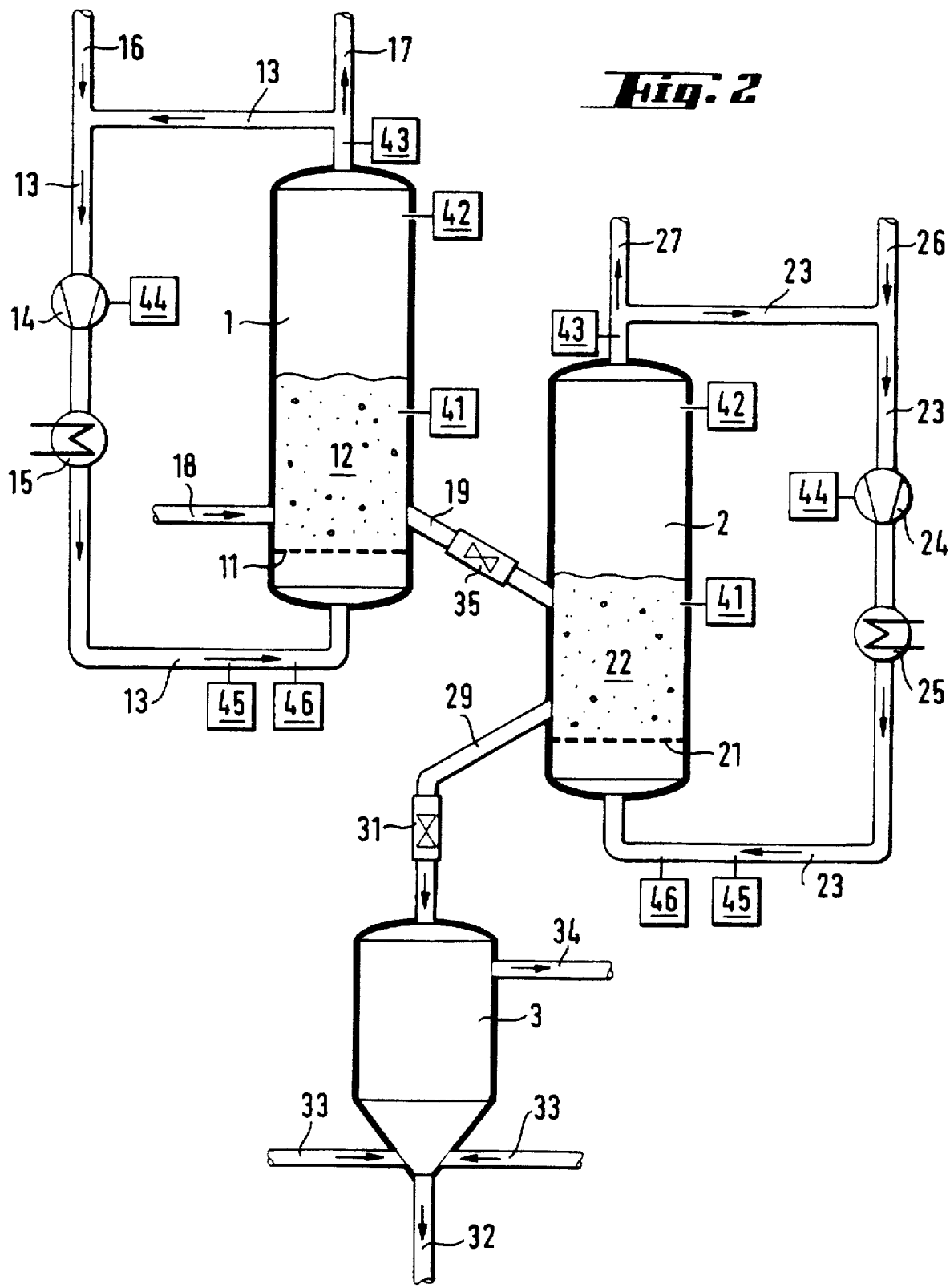

PROCESS FOR PREPARING A POLY-1-OLEFIN

This application is a continuation of Ser. No. 202,831 filed Feb. 28, 1994 now abandoned.

DESCRIPTION

Process for preparing a poly-1-olefin

The invention relates to a process for preparing a spherical poly-1-olefin by means of a highly active spherical Ziegler catalyst.

A large number of catalysts of the Ziegler type for the polymerization of alpha-olefins are already known. Many of these catalysts are based on a magnesium chloride support material obtained by reaction of an organomagnesium compound with a compound R'—Cl, such as tetrachloromethane (cf. U.S. Pat. No. 4,442,225, U.S. Pat. No. 4,439,539, DE 30 10 202).

However, this reaction does not make it possible to obtain a magnesium chloride having spherical particles.

On the other hand, it is known that spherical magnesium chloride is formed on reaction of an organomagnesium compound $R_2Mg$ with an organic chlorine compound R'—Cl in the presence of an organoaluminum compound, such as triethylaluminum, and an electron donor compound, such as diisoamyl ether (cf. EP 99 284). R' has to be a hydrocarbon radical with three or more carbon atoms and the carbon atom adjacent to the chlorine has to be either a secondary or tertiary carbon atom.

Processes are also known in which spherical Ziegler catalysts are formed by reaction of an organomagnesium compound (e.g. ®BOMAG-A, Witco GmbH) with an organic chlorine compound, an electron donor and a transition metal compound (cf. EP 249 869, WO 9 200 332). In these cases, electron donors are required for binding the transition metal component.

It has now been found that a highly active spherical Ziegler catalyst can be prepared by reaction of the reaction product of an organomagnesium compound, an organic chlorine compound and, if desired, an organoaluminum compound with alcohols and transition metal compounds, although the alcohol can also be omitted. It has also been found that the catalyst can be particularly advantageously used in a gas-phase polymerization process.

The invention accordingly provides a process for preparing a polyolefin by polymerization of alpha-olefins at a temperature from 50° to 150° C. and a pressure from 1 to 40 bar in the presence of a catalyst comprising a transition metal component (component A) and an organometallic compound (component B), said component A having been obtained by a) reaction of an organomagnesium compound of the formula $R^1_xMgR^2_{2-x}$, in which $R^1$ and $R^2$ are identical or different alkyl radicals having from 2 to 12 carbon atoms and x is a number between 0 and 2, with an aliphatic primary chlorinated hydrocarbon in an amount from 0.5 to 2.5 mol of the chlorinated hydrocarbon per 1 mol of the organomagnesium compound and, if desired, an organomaluminum compound of the formula $AlR^3_n(OR^4)_{3-n}$, in which $R^3$ and $R^4$ are identical or different alkyl radicals having from 1 to 8 carbon atoms and n is 0, 1, 2 and 3, or the reaction product of trialkylaluminums or dialkylaluminum hydrides with diolefins containing from 4 to 20 carbon atoms, at a temperature from 30° to 110° C., b) treatment of the solid obtained with an alcohol in an amount from 0.001 to 1 mol per gram atom of magnesium contained in the solid at a temperature from −20° to 150° C., and c) reaction of the support material thus obtained with one or more compounds of the formula $M^1X_m(OR^5)_{4-m}$, in which $M^1$ is titanium or zirconium, $R^5$ is an alkyl radical having from 2 to 10 carbon atoms, X is a halogen atom and m is an integer from 0 to 4, in an amount from 0.1 to 5 mol per gram atom of magnesium contained in the support material at a temperature from 20° to 180° C., or by carrying out steps a and c with omission of b, or by simultaneously carrying out steps b and c.

First, a spherical solid is formed. For this purpose, an organomagnesium compound is reacted with an organic chlorine compound and, if desired, an organoaluminum compound.

The organomagnesium compound is a dialkylmagnesium of the formula $R^1_xMgR^2_{2-x}$, in which $R^1$ and $R^2$ are identical or different alkyl radicals having from 2 to 12 carbon atoms and x is a number between 0 and 2. Preference is given to di-n-butylmagnesium, di-n-octylmagnesium, n-butyln-octylmagnesium, n-butylethylmagnesium, n-butyl-secbutylmagnesium or mixtures of these compounds. Particular preference is given to a dialkylmagnesium of the formula [(n—$C_4H_9$)$_{1.2-1.7}$(n—$C_8H_{17}$)$_{0.3-0.8}$Mg], in particular [(n—$C_4H_9$)$_{1.5}$(n—$C_8H_{17}$)$_{0.5}$Mg].

Suitable aliphatic primary chlorinated hydrocarbons are, for example, -tetrachloromethane, trichloromethane, methylene chloride, 1-chloropropane or 1,1,1-trichloroethane, it also being possible to use mixtures. Preference is given to using trichloromethane and tetrachloromethane.

Suitable organoaluminum compounds are alkyl- or alkoxyaluminum compounds of the formula $AlR^3_n(OR^4)_{3-n}$, in which $R^3$ and $R^4$ are identical or different alkyl radicals having from 1 to 8 carbon atoms and n is 0, 1, 2 and 3. Also suitable is the reaction product of trialkylaluminums or dialkylaluminum hydrides with diolefins containing from 4 to 20 carbon atoms, preferably isoprene. An example is isoprenylaluminum.

To prepare the solid comprising spherical particles, the organomagnesium compound and any organoaluminum compound used are dissolved in an inert liquid hydrocarbon under a nitrogen or argon atmosphere. While stirring uniformly at a temperature from 30° to 110° C., preferably from 40° to 80° C., this solution is combined with a solution of the organic chlorine compound. The reaction can be carried out by adding the organic chlorine compound to the solution of the organomagnesium compound in the liquid hydrocarbon, or vice versa.

In this reaction, both the reaction time and also the degree of dilution of the reactants can be varied within wide limits. The reaction time is from 30 minutes to a number of hours, preferably from 1 hour to 5 hours. The reactants are used as solutions having a molarity from 0.5 up to 15.

The reaction mixture contains up to 2.5 mol, preferably up to 2.0 mol, of the organic chlorine compound per more of the organomagnesium compound.

A suspension of a solid comprising spherical particles is formed. The suspension is fed to the next reaction step without further washing steps. However, the solid can also be first isolated and stored in dried form and resuspended for subsequent further processing.

An aliphatic alcohol is added to the suspension of the solid comprising spherical particles. The alcohol is added to the solid in a molar ratio from 0.001 to 1, preferably from 0.01 to 0.5, mol per gram atom of magnesium at a temperature from −20° to 150° C., preferably from 20° to 90° C. Depending on the reactivity of the reactants, the reaction time is from 0.1 to 3 hours, preferably up to 1 hour.

Aliphatic or cycloaliphatic alcohols or alcohols having a plurality of hydroxyl functions are used. Examples are methanol, ethanol, n-propanol, i-propanol, n-butanol, sec-butanol, t-butanol, pentanols, hexanols, amyl alcohol, ethylhexanol, glycol, glycerol and cyclohexanol. Particular preference is given to using ethanol.

The spherical support material obtained in this way is reacted under a nitrogen or argon atmosphere with a transition metal compound of the formula $M^1X_m(OR^5)_{4-m}$, in which $M^1$ is titanium or zirconium, $R^5$ is an alkyl radical having from 2 to 10 carbon atoms, X is a halogen atom, preferably chlorine, and m is an integer from 0 to 4, but is preferably 2 or 4. It is possible to use a mixture of a number of these compounds or to use a number of these compounds successively. It is also possible to add the alcohol and one or more compounds of the type $M^1X_m(OR^5)_{4-m}$ in parallel.

Preferred compounds are, for example, $TiCl_4$, $TiCl_3(OC_2H_5)$, $TiCl_3(O-iC_3H_7)$, $TiCl_2(OC_2H_5)_2$, $TiCl_2(O-iC_3H_7)_2$, $TiCl_2(O-CH_2C_6H_5)_2$, $TiCl(OC_2H_5)_3$, $Ti(OC_2H_5)_4$ and $ZrCl_4$.

Very particular preference is given to $TiCl_4$.

In the reaction described above, the titanium or zirconium compound is used in an amount from 0.5 to 5 mol, preferably from 0.8 to 2.5 mol, in particular 1 mol, per gram atom of magnesium in the spherical support material. The reaction temperature is from 20° to 180° C., preferably from 60° to 100° C., and the reaction time is, depending on the titanium or zirconium coating required, from 30 minutes to a number of hours, preferably from 1 to 2 hours.

The catalyst component A prepared in this way is finally freed of soluble components such as metal or halogen compounds by repeated washing with an inert hydrocarbon at a temperature from 0° to 100° C., preferably from 10° to 60° C.

The catalyst component A prepared according to the invention is in the form of spherical particles having an average diameter from 20 to 150 μm, preferably from 40 to 80 μm, and having a ratio of mass average diameter, $D_m$, to number average diameter, $D_n$, of less than 1.5, preferably from 1.02 to 1.3.

To increase the mechanical stability, the catalyst component A can be subjected to a prepolymerization prior to the actual polymerization. For this purpose, the catalyst component A is transferred into a reactor which has previously been charged with a suspension medium and aluminum alkyl.

The suspension medium used is a saturated hydrocarbon having from 3 to 15 carbon atoms, such as, for example, propane, butane, pentane, hexane, heptane, octane, nonane, decane, cyclohexane or mixtures of such compounds or isomers thereof.

The aluminum alkyl is one having from 1 to 20 carbon atoms in the alkyl radicals, as described under component B.

The prepolymerization is carried out at a temperature from 50° to 110° C., preferably from 50° to 95° C., a pressure from 0.5 to 20 bar, preferably from 0.5 to 8 bar, over a period of time from 0.5 to 6 hours, preferably from 0.5 to 1.5 hours.

The component A is used in the form of a suspension in an inert hydrocarbon, or else in dry form after removal of the suspension medium, or as a prepolymer, for the polymerization of alpha-olefins.

Preference is given to the polymerization of ethylene or propylene or the copolymerization of ethylene with propylene or the copolymerization of ethylene or propylene with an alpha-olefin having from 4 to 10 carbon atoms and one or more double bonds, such as 1-butene, isobutene, 4-methylpentene, 1-hexene or 1,3-butadiene.

The polymerization is carried out continuously or batchwise in suspension in a saturated hydrocarbon having from 3 to 15 carbon atoms, such as propane, butanes, pentanes, hexanes, heptanes, octanes, nonanes, cyuclohexanes or mixtures of such compounds or is carried out continuously in the gas phase. Preference is given to polymerization in the gas phase.

In general, hydrogen is used as molecular weight regulator.

As component B (cocatalyst), an organometallic compound of groups I to III of the Periodic Table is used. Preference is given to using an aluminum compound of the formula $AlR^6_pY_{3-p}$, in which p is 1, 2 or 3 and $R^6$ is an alkyl or aryl radical having from 1 to 20 carbon atoms and Y is hydrogen, a halogen atom or an alkoxy or aryloxy group each having from 1 to 20 carbon atoms.

Examples are trialkylaluminums, alkylaluminum hydrides, and halogen-containing organoaluminum compounds, such as dialkylaluminum halides, alkylaluminum dihalides or alkylaluminum sesquichlorides, which can be used alone or as mixtures. The organoaluminum compounds used are particularly preferably chlorine-free compounds. Suitable compounds for this purpose are, on the one hand, trialkylaluminums $AlR^6_3$ or dialkylaluminum hydrides of the formula $AlR^6_2H$, in which $R^6$ is an alkyl radical having from 1 to 20 carbon atoms. Examples are $Al(CH_3)_3$, $Al(C_2H_5)_3$, $Al(C_2H_5)_2H$, $Al(C_3H_7)_3$, $Al(C_3H_7)_2H$, $Al(iC_4H_9)_3$, $Al(iC_4H_9)_2H$, $Al(C_8H_{17})_3$, $Al(C_{12}H_{25})_3$, $Al(C_2H_5)$ $(C_{12}H_{25})_2$, $Al(iC_4H_9)$ $(C_{12}H_{25})_2$.

On the other hand, suitable chlorine-free organoaluminum compounds are also the reaction products of trialkylaluminums or dialkylaluminum hydrides having hydrocarbon radicals containing from 1 to 6 carbon atoms, preferably $Al(iC_4H_9)_3$ or $Al(iC_4H_9)_2H$, with diolefins containing from 4 to 20 carbon atoms, preferably isoprone. An example which may be mentioned is isoprenylaluminum.

It is also possible to use mixtures of organometallic compounds of groups I to III of the Periodic Table, in particular mixtures of various organoaluminum compounds.

The following mixtures may be mentioned by way of example:

$Al(C_2H_5)_3$ and $Al(iC_4H_9)_3$, $Al(C_2H_5)_2Cl$ and $Al(C_8H_{17})_3$, $Al(C_2H_5)_3$ and $Al(C_8H_{17})_3$, $Al(C_4H_9)_2H$ and $Al(C_8H_{17})_3$, $Al(C_4H_9)_3$ and $Al(C_8H_{17})_3$, $Al(C_2H_5)_3$ and $Al(C_{12}H_{25})_3$, $Al(C_4H_9)_3$ and $Al(C_{12}H_{25})_3$, $Al(C_2H_5)_3$ and $Al(C_{16}H_{33})_3$, $Al(C_3H_7)_3$ and $Al(C_{18}H_{37})_2(iC_4H_9)$ and isoprenylaluminum (reaction product of isoprene with $Al(iC_4H_9)_3$ or $Al(iC_4H_9)_2H$).

The component A can be reacted as a suspension directly with the component B; however, it can first be isolated and stored as a solid and resuspended for subsequent further use.

The component A and the component B can be mixed prior to polymerization in a stirred reactor at a temperature from −30° to 150° C., preferably from −10° to 120° C. It is also possible to combine the two components directly in the polymerization reactor at a polymerization temperature from 20° to 150° C. However, the component B can also be added in two steps, by, prior to the polymerization reaction, reacting the component A with part of the component B at a temperature from −30° to 150° C. and adding the remainder of the component B in the polymerization reactor at a temperature from 20° to 200° C.

The polymerization temperature is from 50° to 150° C., preferably from 50° to 100° C., and the pressure is from 1 to 40 bar, preferably from 3 to 25 bar.

It is particularly advantageous to use the above-described catalyst in the gas-phase polymerization process depicted in the figures.

Definitions (1) Reactor or first reactor (2) Second reactor
(11) Gas distributor (21) Gas distributor
(12) Fluidized bed (22) Fluidized bed
(13) Circulating gas line (23) Circulating gas line
(14) Compressor (24) Compressor
(15) Heat exchanger (25) Heat exchanger
(16) Feed line (26) Feed line
(17) Waste gas line (27) Waste gas line
(18) Feed line
(19) Discharge line (29) Discharge line
(3) Storage hopper [41] Level measurement
(31) Shut-off device [42] Pressure measurement
(32) Offtake line [43] Temperature measurement
(33) Feed line [44] Pressure-difference measurement
(34) Waste line [45] Volume flow measurement
(35) Shut-off device [46] Gas analysis FIG. 1 shows the apparatus used for a single-stage polymerization process. The reactor (1) having a gas distributor (11) is provided with a circulating gas line (13). In this circulating gas line (13), there is arranged a compressor (14) with a heat exchanger (15) downstream thereof. Upstream of the compressor (14), a feed line (16) leads into the circulating gas line (13). A further feed line (18) leads into the reactor (1). At the top of the reactor (1) there is a waste gas line (17) in the circulating gas line (13). Via the discharge line (19) and the shut-off device (31), the reactor (1) can be discharged into a storage hopper (3) which is provided with an offtake line (32). The storage hopper (3) can be flushed with an inert gas via the feed lines (33) and the waste line (34). The apparatus is equipped with devices for level measurement [41], for pressure measurement [42], for temperature measurement [43], for pressure-difference measurement [44], for volume flow measurement [45] and for determination of the gas composition (gas analysis) [46].

FIG. 2 shows the apparatus used for a two-stage polymerization process. The apparatus described in FIG. 1 is supplemented with a second reactor (2) which has a gas distributor (21) and is connected to the reactor (1) via the discharge line (19). The reactor (2) is provided with a circulating gas line (23) in which there is inserted a compressor (24) with downstream heat exchanger (25). Upstream of the compressor (24), a feed line (26) leads into the circulating gas line (23) and at the top of the reactor (2) there is a waste gas line (27). Via a discharge line (29) with shut-off device (31), the reactor (2) can be discharged into the storage hopper (3). The second reactor also is equipped with devices for level measurement [41], for pressure measurement [42], for temperature measurement [43], for pressure-difference measurement [44], for volume flow measurement [45] and for determination of the gas composition (gas analysis) [46].

A coarse-grained fluidized bed (12) comprising spherical particles is introduced into the reactor (1). Near the bottom of the reactor is the gas distributor (11) which supports the fluidized bed (12) in the static state and under operating conditions is permeable to the fine-grained polymer contained in the fluidizing gas (circulating gas). Via the circulating gas line (13), the reaction gas is led under the gas distributor (11) and, after passing through the gas distributor (11), completely fluidizes the fluidized bed (12). However, the mixing of the fluidized bed (12) by the circulating gas can also be carried out below the "fluidizing point". In addition, the reactor (1) can be fitted with a stirrer which can also run along the wall. The circulating gas flow is generated by a compressor (14). The heat of polymerization is conducted away via a heat exchanger (15).

The catalyst is metered in sideways via the feed line (18) above the gas distributor (11) as a dry solid or suspended in a low-boiling hydrocarbon such as, for example, propane, butane or pentane, or as a paste. The catalyst is preferably fed in below the surface of the fluidized bed (12). The line (18) carrying the catalyst can be flushed with an inert gas.

The reactants ethylene, hydrogen, comonomer (for example propylene, butane, methylpentene, hexene) and cocatalyst (for example triethylaluminum, isoprenylaluminum, triisobutylaluminum, ethylaluminum sesquichloride), and also the auxiliary nitrogen, are fed into the circulating gas upstream of the compressor (14) via the line (16). Waste gas is taken off via the line (17). The waste gas flow rate can, if desired, be controlled by a regulating device.

All measured values taken on the apparatus can advantageously be fed into a process control system and used for process control.

The free-flowing polymer powder is discharged via a discharge line (19) into a storage hopper (3). The discharge line (19) contains a shut-off device (31) which can comprise a lock or two pulsed valves in series, so that discharge takes place continuously or quasi-continuously. The discharge line (19) is constructed with a sufficiently large slope as a gravity-fall line. The storage hopper (3) can be flushed with an inert gas, for example nitrogen, via the feed lines (33) and the waste line (34) to remove the monomer from the product. In fact it is possible for the product to be continuously passed through and flushed with the inert gas.

The process can be operated in a single stage (FIG. 1) or in a number of stages (FIG. 2). FIG. 2 schematically shows the two-stage method of operation. As can be seen from the diagram, the individual stages of the multistage method of operation essentially correspond to the single-stage process. The product from the first stage passes via the line (19) and a shut-off device (35) (which corresponds to the shut-off device 31) in the fluidized bed (22) into the reactor (2). In contrast to the first stage, there is here no metering-in of catalyst. The discharge line (29) is constructed as a gravity-fall line and leads the polymer into the storage hopper (3). In this case the line (29) contains the shut-off device (31).

The particles of the polymers and copolymers prepared according to the process of the invention have a compact uniform spherical shape and a very narrow particle size distribution. The ratio of the mass average diameter, $D_m$, to the number average diameter, $D_n$, is less than 1.5, preferably from 1.02 to 1.3. The ratio D/d lies in the range from 1.05 to 1.2. The diameter of the polymer particle lies in the range from 100 to 1500 µm, preferably from 300 to 1000 µm. The polymers possess a high bulk density.

A further advantage of the catalyst of the invention lies in the high catalyst activity, so that only very small amounts of the catalyst are required for the polymerization. For this reason, the polymers also do not have to be subjected to any additional post-treatment such as, for example, complicated washing or purification operations. Furthermore, there is no undesired discoloration of the product due to catalyst residues.

The residual titanium and/or zirconium content in the polymers prepared according to the invention is less than 10 ppm, preferably less than 3 ppm.

Owing to its good responsiveness to hydrogen, the catalyst is particularly suited to two-stage processes for preparing polymers having a broad bimodal molecular weight distribution.

The replacement of sulfur-containing electron donors such as diethyl sulfite by alcohols such as ethanol leads to an elimination of odor problems and to broadened opportunities for use of the polymer.

Owing to the spherical shape of the particles and the associated very good flow behavior of the polymers and copolymers, considerable simplification and advantages in handling, drying and processing are achieved.

Embodiments of the invention will now be more particularly described by way of example.

The melt flow index (MFI (190/5) was determined in accordance with DIN 53735 at 190° C. and under a load of 5 kp.

The ratio of $D_m$ to $D_n$ was determined in accordance with NF X 11-630 of June 1981:

$D_m = [\Sigma n_i(D_i)^3 D_i]/[\Sigma n_i(D_i)^3]$
$D_n = [\Sigma n_i D_i]/\Sigma n_i$
$n_i$=Number of samples having the same diameter
$D_i$=Diameter of the i-th sample The particle size distribution $D_m/D_n$ of the component A was determined by means of image analysis.

EXAMPLE 1

27.7 cm³ (285 mmol) of CCl₄ in 140 cm³ of petroleum spirit (boiling range 100°/120° C.) were added to 306 cm³ of a solution of butyloctylmagnesium (285 mmol of Mg) of the approximate composition [(n—C₄H₉)₁.₅(n—C₈H₁₇)₀.₅Mg], which is commercially available under the name ®BOMAG-A, in heptane over a period of 90 minutes at from 70° to 80° C. The mixture was subsequently stirred for 120 minutes at 85° C. The resulting suspension was admixed over a period of 5 minutes at a temperature of 85° C. with a mixture of 7.6 cm³ (130 mmol) of absolute ethanol and 8.4 cm³ of petroleum spirit (boiling range 100°/120° C.) and was subsequently stirred for one hour (at 85° C. 18.9 cm³ (171 mmol) of TiCl₄ were then added dropwise at a temperature from 93° to 97° C. over a period of 10 minutes. The suspension was stirred for 2 hours at 98° C. and subsequently washed 6 times with 700 cm³ portions of petroleum spirit (boiling range 100°/120° C.) at from 50° to 60° C. Analysis gave a magnesium:titanium:chlorine ratio of Mg:Ti:Cl=1:0.037:2.12.

$D_m/D_n=1.18$.

EXAMPLE 2

306 cm³ of a solution of butyloctylmagnesium (285 mmol of Mg; as in Example 1) in heptane were admixed over a period of 90 minutes with a solution of 49 cm³ (605 mmol) of CHCl₃ in 140 cm³ of petroleum spirit (boiling range 100°/120° C.) and were then stirred for a further 120 minutes at from 75° to 77° C. The resulting suspension was admixed at 85° C. over a period of 15 minutes with a mixture of 3.6 cm³ (62 mmol) of absolute ethanol and 12.4 cm³ of petroleum spirit (boiling range 100°/120° C.) and was subsequently stirred at 85° C. for one hour. 31.4 cm³ (285 mmol) of TiCl₄ were then added dropwise at a temperature of 85° C. over a period of 25 minutes. The suspension was stirred for 2 hours at 94° C. and subsequently was washed 6 times with 700 cm³ portions of petroleum spirit (boiling range 100°/120° C.) at from 50° to 60° C. Analysis gave a magnesium:titanium:chlorine ratio of Mg:Ti:Cl=1:0.031:2.03.

$D_m/D_n=1.12$.

EXAMPLE 3

The procedure was as in Example 2, but 26.2 cm³ (1.25 mmol) of tetraethyl orthotitanate were added instead of ethanol. Analysis gave a magnesium: titanium:chlorine ratio of Mg:Ti:Cl=1:0.174: 2.22.

$D_m/D_n=1.08$.

EXAMPLE 4

The procedure was as in Example 1, but 110 mmol of tetraethyl orthotitanate were added in addition to 15 mmol of ethanol. Analysis gave a magnesium: titanium:chlorine ratio of Mg:Ti:Cl=1:0.103:2.18.

$D_m/D_n=1.15$.

EXAMPLE 5

The procedure was as in Example 2, but, instead of 3.6 cm³ of ethanol, 5.25 cm³ (90 mmol) of ethanol were mixed with 10.75 cm³ of petroleum spirit (boiling range 100°/120° C.) and were reacted at room temperature. Analysis gave a magnesium:titanium:chlorine ratio of Mg:Ti:Cl=1:0.003:2.05.

$D_m/D_n=1.2$.

EXAMPLE 6

The procedure was as in Example 5, but the ethanol/petroleum spirit mixture was added at 85° C. 150 cm³ (corresponding to 2.66 mmol of titanium) of the catalyst suspension were subsequently taken out and admixed with 2.26 cm³ of a 1-molar triethylaluminum solution. The mixture was stirred for 2 hours at 120° C. Subsequently, 46% of the titanium (IV) were reduced to titanium (III). Analysis gave a magnesium: titanium:chlorine ratio of Mg:Ti:Cl=1:0.029:2.04.

EXAMPLE 7

The procedure was as in Example 6, but 1.33 cm³ of a 1-molar triethylaluminum solution were used. The reaction was carried out over a period of 2 hours at room temperature. Subsequently, 25% of the titanium (IV) were reduced to titanium (III). Analysis gave a magnesium: titanium:chlorine ratio of Mg:Ti:Cl=1:0.003:2.05.

EXAMPLE 8

A 1.5 dm³ steel autoclave was charged with 690 cm³ of petroleum spirit (boiling range (100°/120° C.), 20 mmol of triethylaluminum and 93.2 cm³ (corresponding to 10 mmol of titanium) of the catalyst suspension from Example 3. The autoclave was subsequently pressurized with 2 bar of argon and 1.1 bar of hydrogen; the prepolymerization took place after addition of ethylene at a total pressure of 6 bar and a temperature of 65° C. over a period of one hour.

EXAMPLE 9

The procedure was as in Example 2, but the addition of ethanol was omitted. Analysis gave a magnesium:titanium:chlorine ratio of 1:0.018:2.03.

$D_m/D_n=1.04$.

EXAMPLES 10 TO 22

An ethylene polymerization was carried out in accordance with the Table in 800 cm³ of petroleum spirit (boiling range 100°/120° C.) in a 1.5 dm³ steel autoclave at a temperature of 85° C. and a pressure of 6 bar. In each case, the component B added was 1 mmol of triethylaluminum (TEA), 5 mmol of triisobutylaluminum (TIBA) or 5 mmol of isoprenylaluminum (IPRA). The proportion of polymer particles<100 μm was<0.1%.

TABLE

Ethylene polymerization

| Example | Comp. A According to Example | Comp. B | H₂ [bar] | Yield [gPE/ mmol Ti] | MFI 190/5 [g/10 min] | d50 [μm] | BD [g/l] |
|---|---|---|---|---|---|---|---|
| 10 | 1 | TEA  | 3.85 | 23 080 | 12.1 | 470 | 290 |
| 11 | 1 | TIBA | 1.4  | 58 200 | 0.05 | 1480 | 320 |
| 12 | 2 | TIBA | 3.85 | 25 620 | 8.8  | 480 | 340 |
| 13 | 2 | IPRA | 2.1  | 36 420 | 1.4  | 960 | 310 |
| 14 | 3 | IPRA | 4.0  | 1 940  | 46.8 | 340 | 310 |
| 15 | 3 | TIBA | 3.85 | 3 200  | 10.9 | 570 | 300 |
| 16 | 4 | TEA  | 3.85 | 11 300 | 25.3 | 720 | 330 |
| 17 | 4 | IPRA | 1.9  | 5 600  | 0.12 | 960 | 290 |
| 18 | 5 | TIBA | 3.85 | 23 250 | 9.1  | 410 | 340 |
| 19 | 6 | TIBA | 3.85 | 24 750 | 8.4  | 440 | 310 |
| 20 | 7 | TEA  | 3.85 | 29 200 | 9.1  | 440 | 300 |
| 21 | 7 | TIBA | 2.1  | 54 500 | 0.3  | 1230 | 310 |
| 21 | 8 | TEA  | 3.85 | 28 300 | 10.3 | 530 | 320 |
| 22 | 9 | TEA  | 3.85 | 21400  | 8.5  | 420 | 310 |

EXAMPLE 23

For the gas-phase polymerization, the apparatus schematically shown in FIG. 1 was used. Prior to commencement of the reaction, the reactor was charged with 20 kg of polyethylene which had an average particle diameter of 500 μm. At 80° C. and 20 bar, 45 m³/h of a gas mixture were passed upwards through the bed. The gas mixture comprised ethylene, hydrogen and nitrogen. The reactor was continuously supplied with 2 kg/h of ethylene and with catalyst. For this purpose, the catalyst from Example 2 was subjected to a prepolymerization as in Example 8. The amount of catalyst was regulated in such a way that the ethylene partial pressure remained constant. The metering-in of the hydrogen, as molecular weight regulator, was regulated in such a way that the ratio of the partial pressures of ethylene and hydrogen remained constant. Besides the catalyst, triethylaluminum was metered in as cocatalyst in an Al/Ti ratio of 200:1. The polymer obtained under these conditions possessed an MFI 190/5 of 3 g/10 min, a $d_{50}$ value of 600 μm, a proportion of material having $d_{50}<200$ μm of less than 2% and a bulk density of 500 g/dm³.

What is claimed is:

1. A process for preparing a transition metal component for a catalyst for the polymerization of an alpha-olefin, said process comprising:

a) reacting an organomagnesium compound of the formula $R^1_xMgR^2_{2-x}$, in which $R^1$ and $R^2$ are identical or different alkyl radicals having from 2 to 12 carbon atoms and x is a number from 0 to 2, with an aliphatic primary chlorinated hydrocarbon in an amount from 0.5 to 2.5 mol of the chlorinated hydrocarbon per 1 mol of the organomagnesium compound, the resulting product being a spherical solid particle.

b) treating the solid thus obtained with an alcohol in an amount from 0.001 to 1 mol per gram atom of magnesium contained in the solid at a temperature from −20° to 150° C., thereby obtaining a support material, c) reacting the support material thus obtained with one or more compounds of the formula $M^1X_m(OR^5)_{4-m}$, in which $M^1$ is titanium or zirconium, $R^5$ is an alkyl radical having from 2 to 10 carbon atoms, X is a halogen atom and m is an integer from 0 to 4, in an amount from 0.1 to 5 mol per gram atom of magnesium contained in the support material at a temperature from 20° to 180° C., and wherein said steps (b) and (c) are carried out simultaneously.

* * * * *